United States Patent [19]
Vandemark et al.

[11] 3,938,280
[45] Feb. 17, 1976

[54] MULCH AND METHODS OF MANUFACTURING AND UTILIZING THE SAME

[75] Inventors: Joseph S. Vandemark, Urbana, Ill.; Robert T. Seith, Tuscaloosa, Ala.

[73] Assignee: Gulf States Paper Corporation, Tuscaloosa, Ala.

[22] Filed: June 23, 1975

[21] Appl. No.: 589,354

Related U.S. Application Data

[62] Division of Ser. No. 470,910, May 17, 1974.

[52] U.S. Cl. .................................................. 47/9
[51] Int. Cl.² ........................................... A01G 7/00
[58] Field of Search ........................................ 47/9

[56] References Cited
UNITED STATES PATENTS

| | | | |
|---|---|---|---|
| 1,396,269 | 11/1921 | Eckart | 47/9 |
| 1,534,371 | 4/1925 | Finley | 47/9 |
| 1,846,185 | 2/1932 | Cline et al. | 47/9 |
| 2,030,267 | 2/1936 | Pratt | 47/9 |
| 3,493,464 | 2/1970 | Bowers et al. | 47/9 X |
| 3,810,328 | 5/1974 | Bryan et al. | 47/9 |

Primary Examiner—Robert E. Bagwill
Attorney, Agent, or Firm—Raphael Semmes

[57] ABSTRACT

A mulch comprises a paper sheet covered substantially completely on one side thereof with a water-impervious material and treated at marginal regions only of the opposite side thereof with a water-insoluble fungicide. The marginal regions of the mulch may be treated as the mulch is fed from a supply roll and laid upon the ground, with the water-impervious side facing downward. The treated marginal regions are covered with soil to anchor the mulch and to provide a long-term mulch without substantial deterioration.

4 Claims, 3 Drawing Figures

MULCH AND METHODS OF MANUFACTURING AND UTILIZING THE SAME

This is a division of application Ser. No. 470,910, filed May 17, 1974.

BACKGROUND OF THE INVENTION

This invention relates to mulches and to methods of manufacturing and utilizing the same.

Paper mulches are well known. See, for example, U.S. Pat. Nos. 1,846,185; 2,685,150; 1,803,838; and 1,844,051. It has heretofore been proposed to render the paper mulch waterproof and fungus-resistant by completely coating the paper sheet with suitable fungicide and waterproofing materials. As taught by U.S. Pat. No. 3,493,464, for example, it has also been proposed to produce a fungus-resistant or mold-proof mulch paper by adding suitable materials to the pulp slurry from which the paper is made. The manufacture of all such mulch papers is rather expensive, however, hindering wide-spread utilization of the mulches.

BRIEF DESCRIPTION OF THE INVENTION

In accordance with the present invention, it has been discovered that a highly satisfactory fungus-resistant or mold-proof mulch paper may be produced by coating or covering one side only of a paper sheet with a water-impervious material and by coating marginal regions only of the opposite side of the sheet with a water-insoluble fungicide. The treating of the marginal regions may occur as the sheet is fed from a supply roll and laid upon the ground with the waterproof side against the ground. Then only the treated marginal regions are covered with soil to hold the sheet against the ground for long periods without substantial deterioration.

BRIEF DESCRIPTION OF THE DRAWINGS

The invention will be further described in conjunction with the accompanying drawings, which illustrate preferred and exemplary embodiments, and wherein.

DETAILED DESCRIPTION OF THE INVENTION

Figure 1:
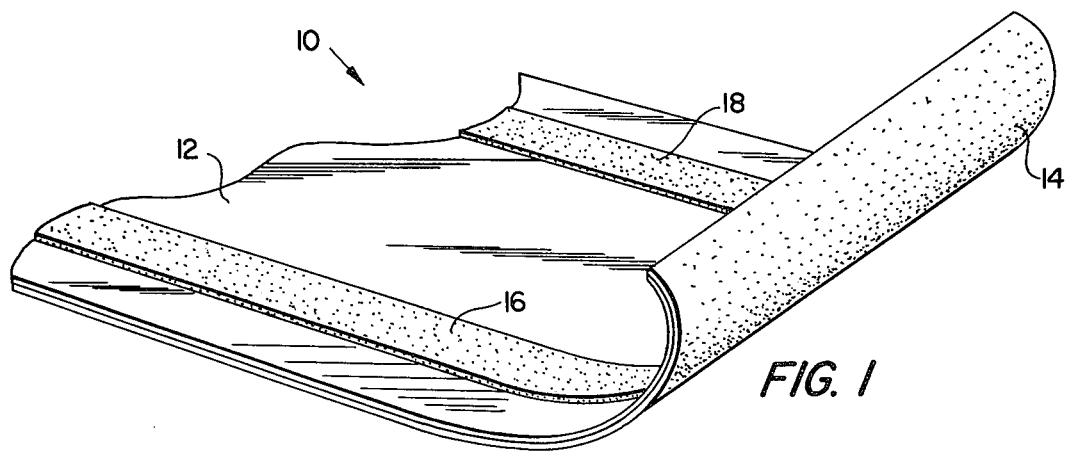
FIG. 1 is a perspective view of a mulch in accordance with the invention.

Referring to the drawings, and initially to FIG. 1 thereof, a mulch 10 of the invention comprises a paper sheet 12, which may be ordinary 60 pound kraft paper, for example, substantially completely covered at one side thereof with a water-impervious material 14. This may be accomplished, for example, by coating or laminating one side of the paper sheet with polyethylene, wax, polyvinyl acetate, Saran, or the like, each of which may form a plastic layer on one side of sheet 12. At the opposite side of the paper sheet the paper is treated, at marginal regions 16 and 18 only, with a water-insoluble fungicide, which may comprise a solution of 99 parts diesel oil and 1 part pentachlorophenol, for example, producing a residual concentration of pentachlorophenol in the treated marginal regions of approximatfely 0.25 to 2%. Other suitable fungicides include 0.25 to 2% orthophenylphenol, 0.05 to 0.5% copper - 8 - quinolinolate, 0.05 to 2% metallic salt (i.e., copper, zinc, aluminum, cobalt, manganese, nickel, iron) of dimethyldithiocarbamic acid and mercaptobenzothiozole. Other metallic chelates of hydroxyquinoline may also be used. The diluent-carrier may be fuel oil or isopropyl alcohol, for example.

Figure 2:
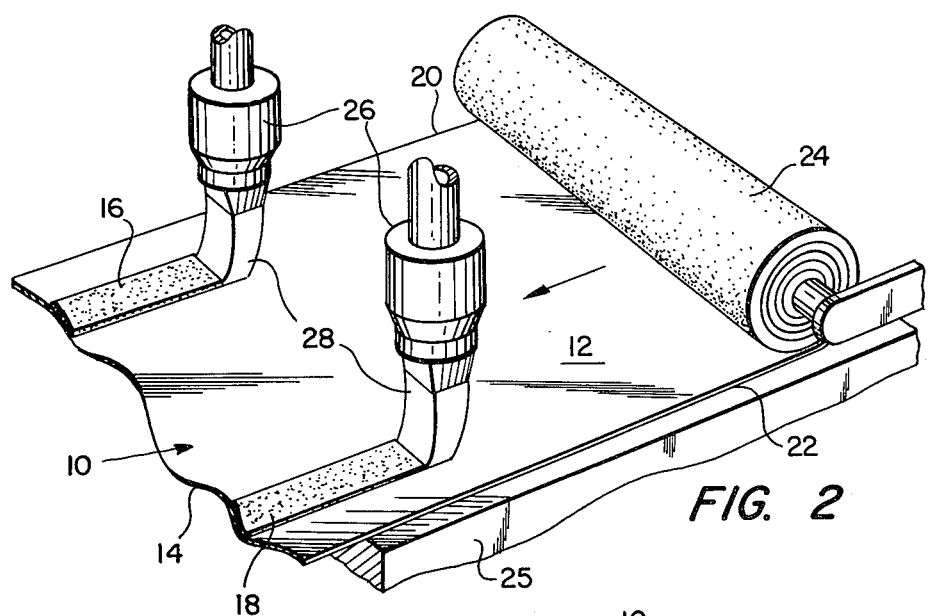
FIG. 2 is a diagrammatic view illustrating the treating of marginal regions of the mulch as the mulch is fed from a supply roll and laid upon the ground.

As shown in FIG. 2, the marginal regions 16 and 18, which are spaced from the longitudinal edges 20 and 22 of the paper sheet, may be treated as the mulch is fed from a supply roll 24, and laid upon the ground with the waterproof side 14 in contact with the ground (although the treatment may be carried out before the paper is rolled). It is well known to feed mulch paper or the like to the ground from a moving vehicle (diagrammatically shown by the vehicle frame 25), and it is also well known to coordinate with the paper mulch delivery other operations, such as paper slitting for plant openings and the transfer of soil or earth to the edges of the paper to retain the mulch upon the ground.

The marginal region treatment apparatus may comprise any suitable apparatus for coating the selected regions of the sheet. Diagrammatically such apparatus is represented by liquid feed tanks 26 and by aplicators 28 (such as sponges or spray heads). Other suitable coating apparatus, such as the type employing cooperating padding rolls, pressure rollers, and metering rolls or doctor blades, may be employed, as will be apparent to those skilled in the art.

Figure 3:
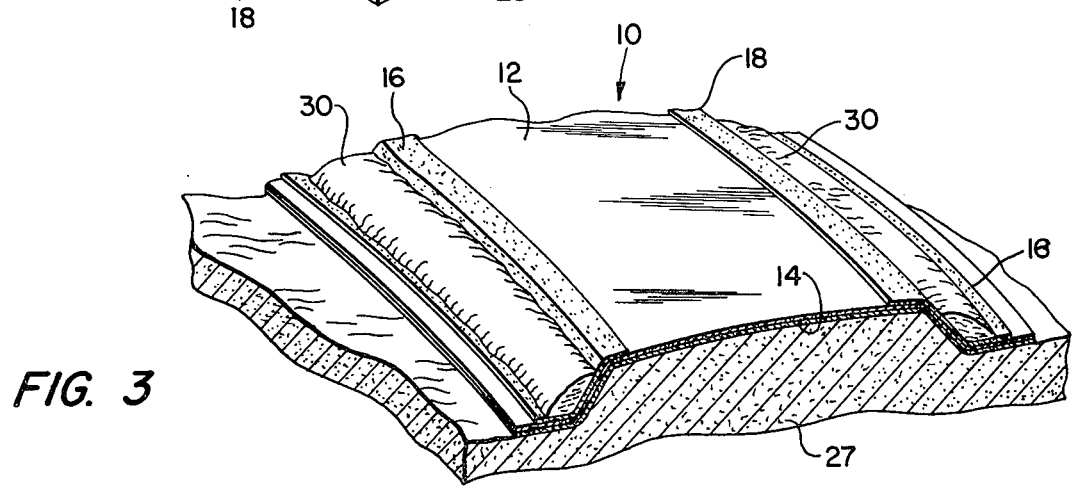
FIG. 3 is a perspective view illustrating the manner in which the mulch is held down on the ground.

As or after the mulch is applied to the ground 27, as shown in FIG. 3, the treated marginal regions 16 and 18 are covered with soil 30 or the like to retain the mulch upon the ground. It has been discovered that maximum deterioration of untreated paper occurs at the soil/air/paper interface, becoming significantly less severe below the surface of the soil. Hence, by treating the paper sheet at the marginal regions covered by the soil and slightly beyond such regions, minimal deterioration occurs for prolonged periods of time (at least one growing season). The regions immediately adjacent to the longitudinal edges need not be treated, because the soil need not cover such regions. In addition, the invention is much less expensive than prior art fungus-resistant or mold-proof mulches which are treated uniformly throughout the mulch.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A method of providing a mulch, which comprises providing a supply of paper sheet covered substantially completely on one side thereof with a water-impervious material, feeding said sheet from said supply, laying said sheet upon the ground with said material against the ground as the sheet is fed from the supply, treating marginal regions only of the opposite side of said sheet adjacent to opposite longitudinal edges thereof with a water-insoluble fungicide, and placing soil or the like substantially upon the treated regions only in order to hold down the sheet upon the ground, without substantial deterioration of the sheet, for a protracted period.

2. A method in accordance with claim 1, wherein said treating occurs while said sheet is being fed from said supply and laid upon the ground.

3. A method in accordance with claim 1, wherein said marginal regions are spaced from said edges.

4. A method in accordance with claim 1, wherein said water-impervious material is a plastic layer.

* * * * *